Patented Oct. 18, 1932

1,882,825

UNITED STATES PATENT OFFICE

WILLIAM J. HALE AND JOSEPH W. BRITTON, OF MIDLAND, MICHIGAN, ASSIGNORS TO THE DOW CHEMICAL COMPANY, OF MIDLAND, MICHIGAN, A CORPORATION OF MICHIGAN

MANUFACTURE OF HYDROXY AROMATIC COMPOUNDS

No Drawing. Application filed October 30, 1926. Serial No. 145,365.

In the patent application of W. J. Hale and E. C. Britton, Serial No. 647,898, filed June 26, 1923, it was shown that hydroxylic derivatives of aromatic compounds of condensed nucleus type can be made by reacting upon halogenated hydrocarbons by means of a salt of a strong base and weak acid. We have now found that this reaction may be surprisingly improved in speed and smoothness by suitable procedure. To the accomplishment of the foregoing and related ends, the invention, then, consists of the steps hereinafter fully described, and particularly pointed out in the claims, the following description setting forth but one of the various ways in which the principle of the invention may be used.

In accordance with our invention, a multicyclic hydrocarbon, as for instance any of the naphthalenes, anthracenes, or derivatives, indenes, flavenes, etc. and a salt of a strong base and weak acid are heated under pressure in water and in contact with an agent facilitating the reaction. For the latter agent copper in available form is particularly effective. The copper may be provided as strips, cuttings or the like in the reaction vessel, or in some cases a copper lining.

Among the salts suitable for this process are in general those of strong base such as to react with the halogen of the halogenated hydrocarbon, while the acid radical is relatively weak, but not however weaker than the hydroxyl product. Instances of such salts are the carbonates, phosphates, and borates of the alkali metals. As an example illustrative of the invention, β-naphthol for instance, may be prepared as follows: β-chloronaphthalene and sodium carbonate in about equal molecular proportions are heated in water to a temperature of 250° to 375° C., preferably about 325° C., under pressure for instance 3000 to 4000 pounds per square inch, in an autoclave or a tubular system providing extensive exposed surfaces of copper. After one-fourth to one-half hour, the β-naphthol is steamed out. As a further means of securing extensive surface contact with the copper, the reaction materials may be actively circulated, for example by recycling if a tubular system be employed, or stirring or the like where the copper is in the form of baffles, etc.

In similar manner α-naphthol, or anthranols for instance, etc. can be made from the corresponding halogenated hydrocarbons.

Where sodium phosphate or a salt other than a carbonate is used, it is advantageous after the reaction to add sufficient soda or the like to convert any free acid back to the salt available for further reaction.

Other modes of applying the principle of the invention may be employed, change being made as regards the details disclosed, provided the step or steps stated in any of the following claims or the equivalent of such be employed.

We therefore particularly point out and distinctly claim as our invention:—

1. A method of making free beta-naphthol which comprises heating to 250°–375° C. under pressure beta-chloronaphthalene with water and a salt of a strong base and weak acid, while in contact with metallic copper.

2. A method of making a free naphthol, which comprises heating to 250°–375° C. under pressure a halogenated naphthalene with water and a salt of a strong base and weak acid while actively circulating such reaction materials over extensive copper surfaces.

3. A method of making a free naphthol, which comprises heating to 250°–375° C. under pressure a halogenated naphthalene with water and a salt of a strong base and weak acid, while in contact with metallic copper.

4. In a method of making a free hydroxyl derivative of a multicyclic aromatic hydrocarbon, the step which consists in heating under pressure at a temperature between 250° and 375° C. a halogenated derivative of such hydrocarbon and a salt of an alkali metal and weak acid in water while in contact with metallic copper.

5. In a method of making a free hydroxyl derivative of a multicyclic aromatic hydrocarbon, the step which consists in heating under pressure at a temperature between 250° and 375° C. a halogenated derivative of such hydrocarbon and a salt of a strong base and weak acid in water while actively circulating such reaction materials over extensive copper surfaces.

6. A method of making a free naphthol which comprises heating under pressure at a temperature between 250° and 375° C. a halogenated naphthalene with an aqueous alkali metal carbonate solution in about equal molecular proportions, while in contact with metallic copper.

7. A method of making a naphthol which comprises reacting a halogenated naphthalene with an aqueous solution of a basic salt from the group consisting of the alkali-metal carbonates, borates and phosphates by heating under pressure at a temperature between 250° and 375° C. in the presence of metallic copper, whereby the free naphthol instead of an alkali-metal salt thereof is formed, and separating such naphthol directly from the reaction product without acidification thereof.

8. A method of making a naphthol which comprises reacting a chlorinated naphthalene with an aqueous solution of a basic salt from the group consisting of the alkali-metal carbonates, borates and phosphates by heating under pressure at a temperature between 250° and 375° C. in the presence of metallic copper, whereby the free naphthol instead of an alkali-metal salt thereof is formed, and separating such naphthol directly from the reaction product without acidification thereof.

9. A method of making a naphthol which comprises reacting a chloronaphthalene with an aqueous sodium carbonate solution by heating under pressure at a temperature between 250° and 375° C. in the presence of metallic copper, whereby the free naphthol instead of the sodium salt thereof is formed, and separating such naphthol directly from the reaction product without acidification thereof.

10. A method of making beta-naphthol which comprises reacting beta-chloronaphthalene with an aqueous sodium carbonate solution by heating under pressure at a temperature between 250° and 375° C. in the presence of metallic copper, whereby free beta-naphthol instead of the sodium salt thereof is formed, and separating said beta-naphthol directly from the reaction product without acidification thereof.

Signed by us this 22nd day of October, 1926.

WILLIAM J. HALE.
JOSEPH W. BRITTON.